3,814,617
PROCESS FOR PRODUCING THE SUPPORT OF A PHOTOGRAPHIC MATERIAL

Tsuneo Kasugai and Nobuhiko Minagawa, Shizuoka, and Masamichi Sato, Saitama, Japan, assignors to Fuji Photo Film Co., Ltd., Kanagawa, Japan
No Drawing. Filed June 9, 1971, Ser. No. 151,521
Claims priority, application Japan, June 17, 1970, 45/52,608
Int. Cl. B44d 1/14; G03c 1/80
U.S. Cl. 117—34          10 Claims

ABSTRACT OF THE DISCLOSURE

A process for producing a support for use in a photographic material, which comprises providing a subcoat layer containing a resin having an adhesive property with a photographic emulsion and a low molecular weight polyethylene on the surface of a support having a polyolefinic surface, and then heating the subcoat layer, is disclosed.

BACKGROUND OF THE INVENTION

(1) Field of the invention

This invention relates to a process for producing a support having a polyolefinic surface, such as a polyolefin film and a polyolefin-coated paper, for use in a photographic material. More particularly, this invention relates to a process for subcoating the support.

(2) Description of the prior art

When a photographic emulsion is coated on the surface of a polyolefin support, such as polyethylene and polypropylene, sufficient adhesion between the photographic emulsion layer and the support cannot be obtained since the polyolefinic surface is chemically inert. A cellulose acetate or a linear polyester support has conventionally been subcoated by a process which involves coating the support with a solution or a suspension of a resin having adhesive property with a photographic emulsion in a solvent which dissolves or swells the support, thereby to form a subcoat layer, and bonding a layer of the photographic emulsion to the support through the medium of the subcoat layer. This process, however, cannot be applied to supports having a polyolefinic surface (to be referred to hereinafter as polyolefin supports) because no suitable solvents exist which will swell or dissolve polyolefin.

In the bonding of the polyolefin support and a photographic emulsion layer, it is known to pretreat the surface of the support using various methods such as corona discharge, flame treating or chemical oxidation with chromic acid. However, these methods have the disadvantage that the adhesive effect obtained is reduced on storage before coating a photographic emulsion on the treated surface. It has been necessary therefore to coat a photographic emulsion within a short time, or to provide a subcoat layer to protect the treated surface.

It is an object of this invention to provide the process for producing a polyolefin support for use in a photographic material, which has provided thereon a subcoat layer having an adhesive property with a photographic emulsion.

SUMMARY OF THE INVENTION

According to this invention, this object can be achieved by providing a subcoat layer containing a low-molecular weight polyethylene and hydrophilic resin having an adhesive property with a photographic emulsion on a polyolefin support whose surface is not treated, and then heating the support whereby the subcoat layer is firmly bonded to the polyolefin support.

DESCRIPTION OF THE INVENTION

Heating the support according to the process of this invention may be performed by any conventional heating means such as hot air, infrared rays, heated rolls, microwaves, or laser. It is preferred that the surface of the support after subcoating be subjected to a temperature between 80° C. and 120° C. for at least about 0.5 second. According to the process of this invention, heating of the support can be effected in the drying step after subcoating, and therefore the surface treatment intended for bonding the support and the photographic emulsion layer and the subcoating for prevention of reduction in the adhesive effect can be performed in a single step.

In accordance with this invention, the mixture of (1) an aqueous solution of the hydrophilic resin having an adhesive property with a photographic emulsion or dispersion of it in a mixture of water and an organic solvent miscible with water, and (2) an aqueous dispersion of a low molecular weight polyethylene is coated on the surface of a polyolefin support to which a photographic emulsion is to be applied. The suitable thickness of the subcoat layer formed by this procedure is about 0.01 to 5μ. The aqueous dispersion of a low molecular weight polyethylene may be prepared by adding liquid polyethylene melted by heating to boiling water containing a surface active agent with vigorous stirring, or by mechanically pulverizing solid low molecular weight polyethylene to a fine powder, and dispersing the powder in water.

Examples of the hydrophilic resin used in the invention include gelatin, modified gelatins such as phthalyl-gelatin, acetyl-gelatin, or succinyl-gelatin, vinyl copolymers containing maleic anhydride as one constituent, vinyl copolymers containing itaconic acid as one constituent, and polyvinyl pyrrolidone. Preferably, the polyethylene should have a molecular weight of not more than 20,000.

The adhesion between the support and the photographic emulsion layer through the medium of the subcoat layer depends upon the ratio of the hydrophilic resin to the polyethylene. We have found that the larger the ratio, the greater the bond strength between the emulsion layer and the subcoat layer and the lower the bond strength between the subcoat layer and the support, and that when the ratio becomes small, the bond strength between the emulsion layer and the subcoat layer is reduced, and the bond strength between the subcoat layer and the support increases. The commercially preferred weight ratio as to the solids content of the hydrophilic resin to polyethylene is 6:1 to 1:5.

A photographic material produced using the support obtained by the process of this invention exhibits sufficient bond strength between the support and a photographic emulsion layer during photographic processing or in a dry condition after processing. Furthermore, the adhesive effect of the support is not reduced with the passage of time from subcoating to the application of a photographic emulsion. The details will be described in the Examples.

The bond strength between the support and the photographic emulsion layer was measured in the Examples as follows.

Measurement of bond strength in dry condition

The surface of a photographic emulsion layer was marred with a razor blade in a cross hatched pattern with the individual lines being spaced at intervals of about 4 mm. A pressure-sensitive adhesive tape was pasted on the thus prepared surface, and quickly stripped off. When 90% or more of the entire surface could not be stripped off by this procedure, the bond-ability or adhesion was evaluated as good.

Measurement of bond strength in processing solutions

In each stage of the processing, one scratch line was made on the surface of a photographic emulsion layer in a processing solution using a steel pen. The scratched line was rubber with a finger tip at right angles to the line. When the photographic emulsion layer was not stripped off at other parts than the scratch line, the bondability or adhesion was evaluated as good.

The following Examples will illustrate the invention in greater detail.

EXAMPLE 1

A photographic raw paper having a unit weight of 170 g./m.² was coated on both sides with polyethylene having a density of 0.92 g./cm.³ at a thickness of about 30μ. A subcoating solution of the following composition was coated on one surface of the resultant polyethylene-coated paper on which surface a photographic emulsion was to be coated, and dried for 2 minutes with hot air at 80° C.

| | | |
|---|---|---|
| Gelatin | g | 15 |
| Salicylic acid | g | 1.5 |
| Water | cc | 60 |
| Methanol | cc | 140 |
| Polyethylene emulsion [1] | cc | 100 |

[1] Polylon 347, product of Chukyo Yushi Kabushiki Kaisha, having a molecular weight of 2,000.

The subcoated surface was heated using a metal roll whose surface was maintained at 100° C. The temperature of the subcoat surface was 90 to 95° C.

The support obtained was allowed to stand for three months in a room at 20° C. and a relative humidity of 60%, and then a gelatin-silver halide emulsion of the following composition was coated on it. The resulting photographic material exhibited good adhesion between the emulsion layer and the support both during the photographic processing and in a dry condition.

| | | |
|---|---|---|
| Gelatin | g | 70 |
| Silver chloride | g | 40 |
| Silver bromide | g | 20 |
| Water | cc | 1000 |

On the other hand, one surface of the same polyethylene-coated paper to which surface a photographic emulsion was to be coated was subjected to corona discharge at 200 w. with an electrode moving rate of 10m./min. using a corona discharge device having a movable electrode with a length of 20 cm. (product of Lepel Company), and then this support was allowed to stand for three months under the same conditions as described above. A gelatin-silver halide photographic emulsion of the same formulation as described above was coated on the resultant support. The photographic material obtained had poor adhesion between the emulsion layer and the support.

EXAMPLE 2

A subcoating solution of the following composition was coated on one surface of a 180μ thick crystalline polypropylene film and then the subject layer was heated and dried using an infrared heater. The heating time was 1.5 minutes, and the maximum temperature of the subcoat surface was 100 to 105° C.

| | | |
|---|---|---|
| 1:1 copolymer of vinyl acetate and maleic anhydride (having a degree of polymerization of $1.0 \times 10^3$) | g | 5 |
| Methanol | cc | 100 |
| Emulsion of low molecular weight polyethylene having a molecular weight of 18,000 (Poly-Em 40, product of Oil and Chemical Company) | cc | 50 |

The resulting support was allowed to stand in a room at 20° C. and a relative humidity of 40% for 3 months, and then a gelatin-silver halide emulsion of the composition described in Example 1 was coated on the subcoat surface. The photographic material obtained had good adhesion between the support and the emulsion layer during photographic processing and in a dry condition.

On the other hand, the surface of the same polypropylene film as described above was subjected to corona discharge using a corona discharge device of the same type as used in Example 1, and then allowed to stand in a room at 20° C. and a relative humidity of 40% for 3 months. A gelatin-silver halide photographic emulsion of the same formulation as used in Example 1 was coated on the support. The resulting photographic material had poor adhesion, and the emulsion layer was entirely stripped off from the support during the photographic processing.

EXAMPLE 3

A subcoating solution of the following composition was coated on one surface of the same polyethylene-coated paper as used in Example 1 on which surface a photographic emulsion was to be coated. It was then dried, and heated by a heated metal roll so that the temperature of the subcoat surface was 80° C.

| | | |
|---|---|---|
| Polyvinyl pyrrolidone | g | 7 |
| Polyacrylic acid | g | 3 |
| 1,4-bis(2,3-epoxypropoxy) butane | g | 1 |
| 30% aqueous ammonia | cc | 0.1 |
| Methanol | cc | 500 |
| Polyethylene emulsion (polyethylene concentration 15%; molecular weight of polyethylene 1,500) | cc | 30 |

The resulting support was allowed to stand in a room at 20° C. and a relative humidity of 60% for 3 months, and then a conventional photographic emulsion for photographic paper was coated on the support. The waterproof photographic paper obtained had good adhesion between the emulsion layer and the support.

What is claimed is:

1. A process for producing a photographic light-sensitive material comprising a support with a light-sensitive layer thereon, said support comprising at least a polyolefinic surface having coated thereon a subcoat layer, said support being adapted to be coated with a photographic light-sensitive emulsion to provide said photographic light-sensitive material, said process comprising:
    (1) coating said polyolefinic surface with a subcoat composition consisting essentially of an aqueous mixture of a low molecular weight polyethylene having a molecular weight of not more than 20,000 and a hydrophilic resin, gelatin or modified gelatins having an adhesive property with said photographic emulsion;
    (2) heating the resulting material to a temperature of from 80 to 120° C. for at least 0.5 second to thereby firmly bond said subcoat composition to said polyolefinic surface;
    (3) coating said support with said photographic light-sensitive emulsion and drying.

2. The process according to claim 1, wherein said subcoat layer is formed from an aqueous mixture consisting essentially of
    (1) a solution or suspension of said resin, gelatin or or modified gelatins in a mixture of water and a water-miscible organic solvent; and
    (2) a suspension of said low molecular weight polyethylene.

3. The process according to claim 1, wherein said resin having an adhesive property with a photographic emulsion is a hydrophilic resin selected from the group consisting of vinyl copolymers containing itaconic acid, vinyl copolymers containing maleic anhydride, and polyvinyl pyrrolidone.

4. The process according to claim 1, wherein said support having a polyolefinic surface is selected from the group consisting of polyolefin films and polyolefin-coated papers.

5. The process according to claim 1, wherein said subcoat layer has a thickness of 0.01 to 5µ.

6. The process according to claim 2, wherein the weight ratio on a solids content basis of said hydrophilic resin to said polyethylene is from 6:1 to 1:5.

7. The process according to claim 2, wherein said polyolefinic surface is untreated prior to said coating.

8. The process according to claim 2, wherein said photographic light-sensitive emulsion is coated onto said support after said first coating step and before said heating step.

9. The photographic light-sensitive material produced by the process of claim 8.

10. The photographic material produced by the process of claim 1.

References Cited
UNITED STATES PATENTS

| | | | |
|---|---|---|---|
| 3,091,536 | 5/1963 | Rusignuolo | 117—34 |
| 3,551,284 | 12/1970 | Portolani | 117—138.8 E |
| 3,340,091 | 9/1967 | Zweig | 117—47 A |
| 3,355,322 | 11/1967 | Worrall | 117—138.8 E |
| 3,037,862 | 6/1962 | Neth | 117—34 |
| 3,483,023 | 12/1969 | Dotson et al. | 117—138.8 E |
| 3,508,944 | 4/1970 | Henderson et al. | 117—138.8 E |
| 3,112,199 | 11/1963 | Camerini et al. | 117—34 |
| 3,031,332 | 4/1962 | Rothacker | 117—47 A |
| 3,421,927 | 1/1969 | Donaldson et al. | 117—138.8 E |
| 2,928,756 | 3/1960 | Campbell | 117—47 A |

WILLIAM D. MARTIN, Primary Examiner

W. R. TRENOR, Assistant Examiner

U.S. Cl. X.R.

96—87; 117—47 A, 72, 76 P, 138.8 E